(12) United States Patent
Koniaris et al.

(10) Patent No.: US 9,081,566 B2
(45) Date of Patent: *Jul. 14, 2015

(54) DYNAMIC CHIP CONTROL

(76) Inventors: Kleanthes G. Koniaris, Palo Alto, CA (US); James B. Burr, Foster City, CA (US); Mark Hennecke, Cupertino, CA (US)

(*) Notice: Subject to any disclaimer, the term of this patent is extended or adjusted under 35 U.S.C. 154(b) by 703 days.

This patent is subject to a terminal disclaimer.

(21) Appl. No.: 13/037,042

(22) Filed: Feb. 28, 2011

(65) Prior Publication Data

US 2011/0296208 A1    Dec. 1, 2011

Related U.S. Application Data

(63) Continuation of application No. 11/529,865, filed on Sep. 29, 2006, now Pat. No. 7,917,772.

(51) Int. Cl.
G06F 1/32 (2006.01)
G05B 13/02 (2006.01)
G06F 1/20 (2006.01)

(52) U.S. Cl.
CPC .............. G06F 1/3203 (2013.01); G06F 1/324 (2013.01); G06F 1/3296 (2013.01); G05B 13/026 (2013.01); G06F 1/206 (2013.01); Y02B 60/1217 (2013.01); Y02B 60/1275 (2013.01); Y02B 60/1285 (2013.01)

(58) Field of Classification Search
CPC . G06F 1/324; G06F 11/3062; Y02B 60/1217; G05B 13/026
USPC ........................................................ 713/300
See application file for complete search history.

(56) References Cited

U.S. PATENT DOCUMENTS

| | | | |
|---|---|---|---|
| 6,424,930 B1 | 7/2002 | Wood | |
| 6,809,606 B2 | 10/2004 | Wong et al. | |
| 6,885,233 B2 | 4/2005 | Huard et al. | |
| 7,345,460 B2 | 3/2008 | Ma et al. | |
| 7,411,436 B2 | 8/2008 | Fang et al. | |
| 7,454,316 B2 | 11/2008 | Bose et al. | |
| 7,475,320 B2 | 1/2009 | Knebel et al. | |
| 2002/0138159 A1* | 9/2002 | Atkinson | 700/21 |
| 2002/0147932 A1* | 10/2002 | Brock et al. | 713/300 |
| 2003/0076183 A1* | 4/2003 | Tam et al. | 331/100 |
| 2003/0125900 A1* | 7/2003 | Orenstien et al. | 702/132 |
| 2003/0231021 A1 | 12/2003 | Alwardi et al. | |

(Continued)

OTHER PUBLICATIONS

Non-Final Office Action Dated Aug. 3, 2009; U.S. Appl. No. 11/540,117.

(Continued)

*Primary Examiner* — Kim Huynh
*Assistant Examiner* — Brandon Kinsey

(57) ABSTRACT

Methods and systems for operating a semiconductor device (e.g., a microprocessor) are described. The microprocessor is initially operated at a voltage and frequency that would be within operating limits at any device temperature. Using models that relate device temperature, operating limits and power consumption with voltage and frequency, the amount of supply voltage and a new operating frequency can be selected. The models are periodically consulted thereafter to continue adjusting the supply voltage and operating frequency, so that the microprocessor is caused to operate at very close to its capacity, in particular in those instances when, for example, processor-intensive instructions are being executed.

19 Claims, 7 Drawing Sheets

(56) References Cited

U.S. PATENT DOCUMENTS

| | | |
|---|---|---|
| 2004/0046247 A1 | 3/2004 | Tower |
| 2004/0128631 A1* | 7/2004 | Ditzel et al. .................. 716/2 |
| 2005/0210905 A1* | 9/2005 | Burns et al. ................ 62/259.2 |
| 2006/0167657 A1 | 7/2006 | Naffziger et al. |
| 2006/0290365 A1 | 12/2006 | Riedlinger et al. |
| 2007/0052453 A1* | 3/2007 | Wald ............................ 327/100 |
| 2007/0061021 A1* | 3/2007 | Cohen et al. ................... 700/30 |

OTHER PUBLICATIONS

Notice of Allowance Dated Mar. 16, 2010; U.S. Appl. No. 11/540,117.

* cited by examiner

DYNAMIC CHIP CONTROL

RELATED APPLICATION

This application is a continuation of the application with Ser. No. 11/529,865, filed Sep. 29, 2006, entitled "Dynamic Chip Control," now U.S. Pat. No. 7,917,772, hereby incorporated by reference in its entirety.

BACKGROUND OF THE INVENTION

1. Field of the Invention

Embodiments of the present invention relate to the operation of semiconductor devices such as microprocessors.

2. Related Art

There are a number of aging and failure mechanisms that can physically affect a semiconductor device (e.g., an integrated circuit or chip such as a microprocessor) and shorten its operating life. Based on studies of those mechanisms, predictions can be made of the effects of the device's operating conditions on the device's operating life. Using those predictions, designers can pick a design operating life and then specify operating limits (e.g., limits on voltage and temperature) that will allow the device to reach its design operating life. The operating limits are enforced during operation to prevent the device from exceeding those limits.

The performance of a device will vary from device to device because of variations that occur during device fabrication ("process" variations). The performance of a device will also vary according to variations in the voltage applied to the device (e.g., its operating voltage) and variations in the device's operating temperature. To account for these variations, a device will generally be operated at less than its capacity, in order to guard against the device exceeding its operating limits. The difference between actual operating conditions and operating limits is sometimes referred to as the guardband.

SUMMARY OF THE INVENTION

Methods and/or systems for operating a semiconductor device (e.g., a microprocessor) that can reduce the guardband would be advantageous. Embodiments in accordance with the present invention provide this and other advantages.

According to one embodiment of the present invention, the microprocessor is initially operating at some voltage and frequency; for example, a voltage and frequency that would be within operating limits at any device temperature. Using models that relate device temperature, operating limits (based on the design operating life), and power consumption with voltage and frequency, the amount of supply voltage and a new operating frequency can be selected. The models are periodically consulted thereafter to continue adjusting the supply voltage and operating frequency, so that the microprocessor is caused to operate at very close to its capacity, in particular in those instances when, for example, processor-intensive instructions are being executed.

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Figure 1:
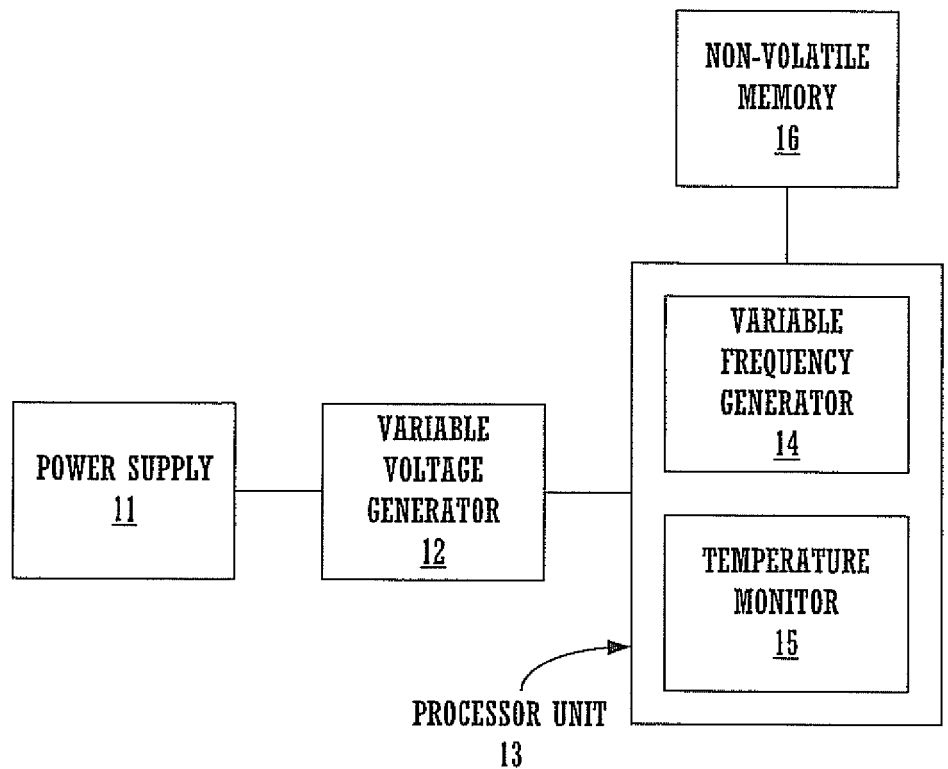
FIG. 1 is a block diagram showing elements of a computer system upon which embodiments of the present invention may be implemented.

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "changing," "adjusting," "measuring," "summing," "receiving," "comparing," "determining,"

"selecting," "using," "transitioning," "quantifying" or the like, refer to the action and processes (e.g., flowchart 70 of FIG. 7) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are described for microprocessor ("processor") operation. However, the present invention is not so limited. In general, embodiments in accordance with the present invention can be used with integrated circuits or semiconductor devices. More specifically, in addition to microprocessors, embodiments in accordance with the present invention can be used with devices such as, but not limited to, microcontrollers and graphics chips.

FIG. 1 is a block diagram showing elements of a computer system 10 upon which embodiments of the present invention may be implemented. Relevant elements of a computer system are illustrated in FIG. 1. That is, computer system 10 can include elements other than those shown, such as volatile memory, a display device, a user interface device (e.g., a keyboard or mouse), and an input/output device allowing the computer system to be coupled to a peripheral device and/or to a network.

In the example of FIG. 1, computer system 10 includes a power supply 11, a variable voltage generator 12, a processor unit 13, and a nonvolatile memory 16.

In one embodiment, processor unit 13 incorporates a variable frequency generator 14 and a temperature monitor 15. Alternatively, the variable frequency generator 14 and/or the temperature monitor 15 may be separate from (external to) the processor unit 13. Also, variable voltage generator 12 may instead be incorporated into processor unit 13. In addition, nonvolatile memory 16 may be incorporated into processor unit 13.

Temperature monitor 15 measures the operating temperature of the processor unit 13. For example, temperature monitor 15 may measure the junction temperature of processor unit 13.

Power supply 11 supplies power to the various components of computer system 10. In the present embodiment, power to the processor unit 13 is supplied via the variable voltage generator 12. In one embodiment, power to variable frequency generator 14 is also supplied via variable voltage generator 12.

In response to commands from processor unit 13, variable voltage generator 12 can increase or decrease the amount of voltage supplied to processor unit 13 and variable frequency generator 14. Similarly, in response to commands from processor unit 13, variable frequency generator 14 can increase or decrease the frequency at which processor unit 13 is to operate. The changes to voltage and frequency are implemented with processor unit 13 still powered on and operable. That is, the changes to voltage and frequency are made without shutting down processor unit 13, and processor unit 13 can continue to execute instructions during the transition to the new voltage and frequency.

If, for example, processor unit 13 is executing instructions that are less processor-intensive, then processor unit 13 can operate at a reduced frequency. In general, microprocessor frequency is roughly proportional to the square root of the voltage supplied to the microprocessor. Thus, if processor unit 13 can operate satisfactorily at a reduced frequency, variable voltage generator 12 can decrease the voltage supplied to processor unit 13 and variable frequency generator 14, and variable frequency generator 14 can reduce the frequency.

Similarly, if processor unit 13 is executing instructions that are more processor-intensive, then variable voltage generator 12 can increase the voltage supplied to processor unit 13 and variable voltage generator 14, and variable voltage generator 14 can increase the frequency at which processor unit 13 is to operate.

According to embodiments of the present invention, detailed models that relate frequency, voltage and temperature, as well as operating life and power consumption, can be utilized to determine the amounts that the supply voltage and/or frequency can be increased or decreased.

Voltage can be increased or decreased in a single step or in a series of smaller steps. In general, the voltage is increased or decreased in a manner that avoids a current surge that could cause a system reset, thereby enabling processor unit 13 to continue executing instructions during the change in voltage.

The discussion above describes one embodiment of a computer system and one embodiment of a microprocessor in which the voltage supplied to the microprocessor and the frequency at which the microprocessor is to operate can both be varied. However, the present invention is not limited to the embodiment of FIG. 1.

Embodiments in accordance with the present invention can also be implemented using a first device (e.g., a controller) that manages the microprocessor. In one such embodiment, with reference to FIG. 1, the controller monitors the temperature of processor unit 13 using temperature monitor 15. The controller can also monitor the operating frequency of processor unit 13 by monitoring variable frequency generator 14. The controller can also be coupled to variable voltage generator 12, so that the controller can monitor and control the amount of voltage being supplied to processor unit 13.

In one embodiment, the controller operates in response to commands from processor unit 13. That is, the controller and processor unit 13 operate in conjunction to establish the operating conditions of processor unit 13. In another embodiment, the controller establishes the operating conditions for processor unit 13 without commands from processor unit 13. For example, based on the current operating conditions of processor unit 13, the controller can change the amount of voltage supplied to processor unit 13 and the operating frequency of processor unit 13. The amount of collaboration between the controller and the processor unit 13 is implementation-specific. In general, embodiments in accordance with the present invention can be implemented with an external controller that manages processor unit 13, or without such a controller. More generally, embodiments of the present invention can be implemented in a computer system that has the capability to vary the voltage supplied to the microprocessor and the operating frequency of the microprocessor, or using a microprocessor that provides that capability.

The characteristics and capabilities of a semiconductor device (e.g., a microprocessor) vary according to process, voltage and temperature (PVT). In general, process refers to the manner in which the device was fabricated—that is, the type of fabrication process used, as well as the device-by-device variability introduced during fabrication. Although such variability may be small, it can have a significant effect on performance from one device to the next.

In general, voltage refers to the voltage or voltages applied to the device. With contemporary devices, multiple voltages may be applied to a device. Thus, voltages can include, but are not limited to, the supply voltage (Vdd), a backbias voltage (Vnw) that may be applied to positive-channel metal-oxide semiconductor (PMOS) devices, and a backbias voltage (Vpw) that may be applied to negative-channel metal-oxide semiconductor (NMOS) devices.

In general, temperature refers to the temperature of operation. The operating temperature of a device can be measured at various locations on the device. Alternatively, the operating temperature may refer to the ambient temperature.

Figure 2:
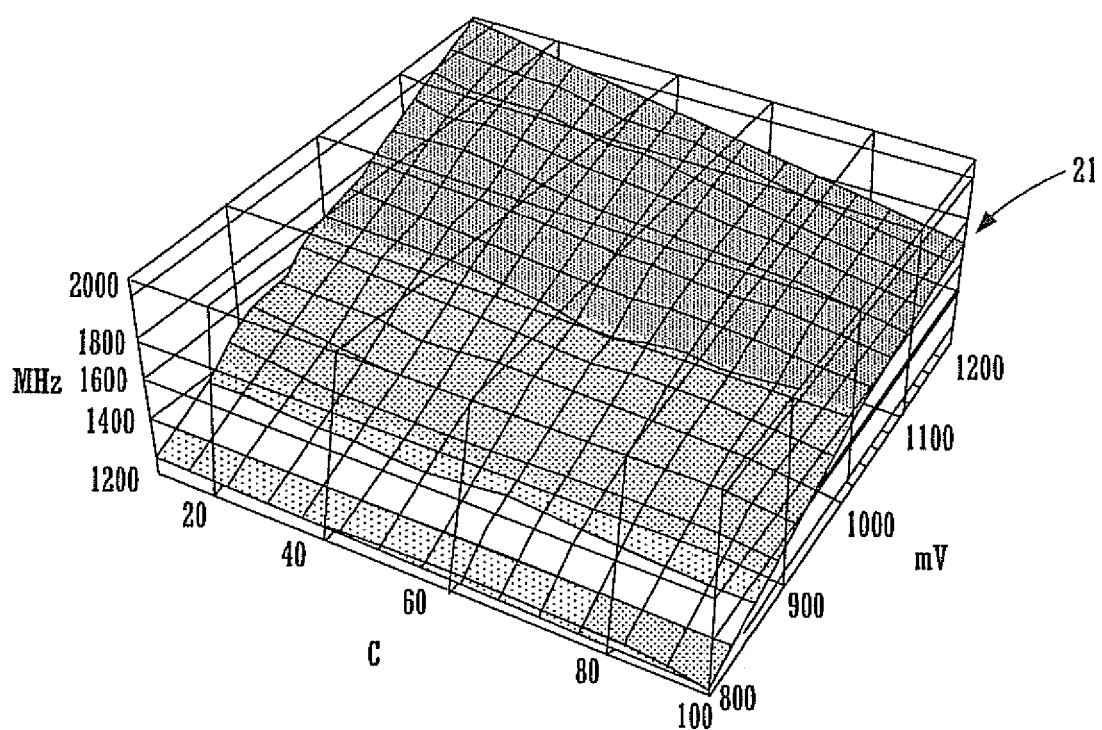
FIG. 2 is an example of a three-dimensional graph showing operating frequency versus temperature and voltage according to one embodiment of the present invention.

FIG. 2 is an example of a three-dimensional graph 20 showing the operating frequency of a microprocessor versus operating temperature and supply voltage, according to one embodiment of the present invention. The surface 21 in graph 20 shows the maximum frequency as a function of temperature in degrees-Centigrade (C) and voltage (e.g., Vdd) in millivolts (mV) at which a known program executes correctly. Other mechanisms and proofs of performance can be used to derive a graph such as graph 20.

Note that, in the example of FIG. 2, the maximum frequency is a continuous function in the mathematical sense.

As indicated in FIG. 2, the frequency can be changed by changing the temperature. For example, for a given supply voltage, the frequency can be increased by decreasing the temperature. Alternatively, by sufficiently cooling the device, the device can continue to operate at a given frequency without increasing voltage.

Figure 3:
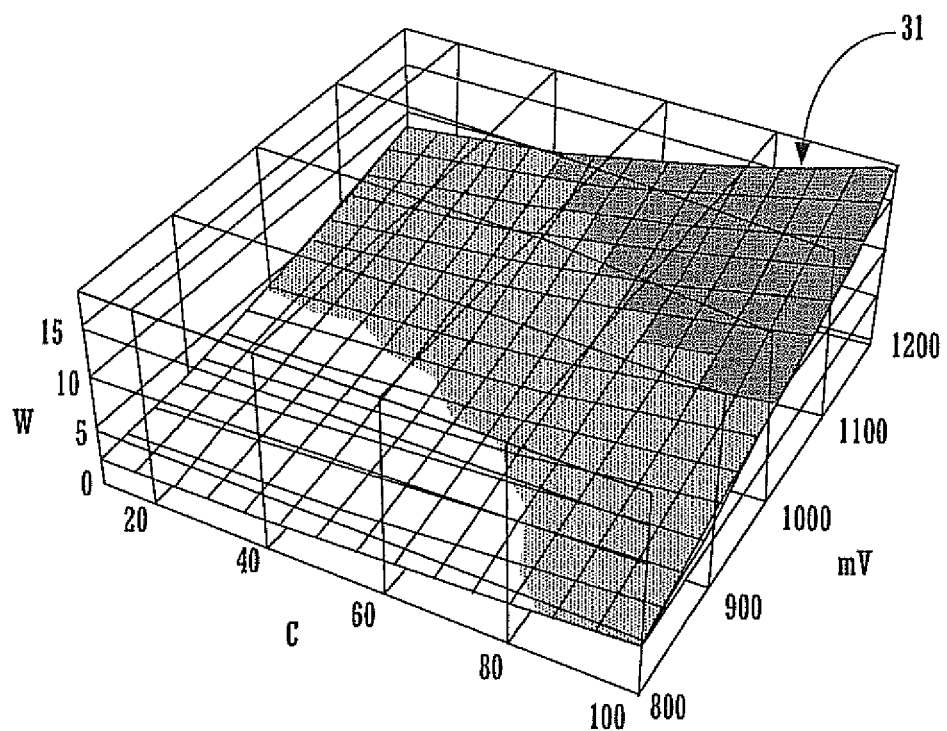
FIG. 3 is an example of a three-dimensional graph showing leakage power versus temperature and voltage according to one embodiment of the present invention.

FIG. 3 is an example of a three-dimensional graph 30 showing leakage power versus temperature and voltage according to one embodiment of the present invention. The surface 31 shows leakage power consumption that is predicted for a device as a function of temperature and voltage. Leakage power accounts for a significant portion, if not the most significant portion, of the power consumed by an integrated circuit. Leakage power is a function of process, temperature and voltage.

The information in FIGS. 2 and 3 can be formula-based. That is, in one embodiment, the information in FIGS. 2 and 3 can be expressed, for example, as a polynomial that describes maximum frequency or leakage power as a function of voltage and temperature. However, the present invention is not so limited. In other embodiments, a maximum frequency predictor can be implemented in hardware as a ring oscillator, and a predictor of leakage power can be implemented as a leakage ring oscillator, for example. In yet other embodiments, external measurements of the microprocessor can be performed to derive maximum frequency and leakage power. In general, the models can be analytically-based, hardware-based or measurement-based.

Figure 4:
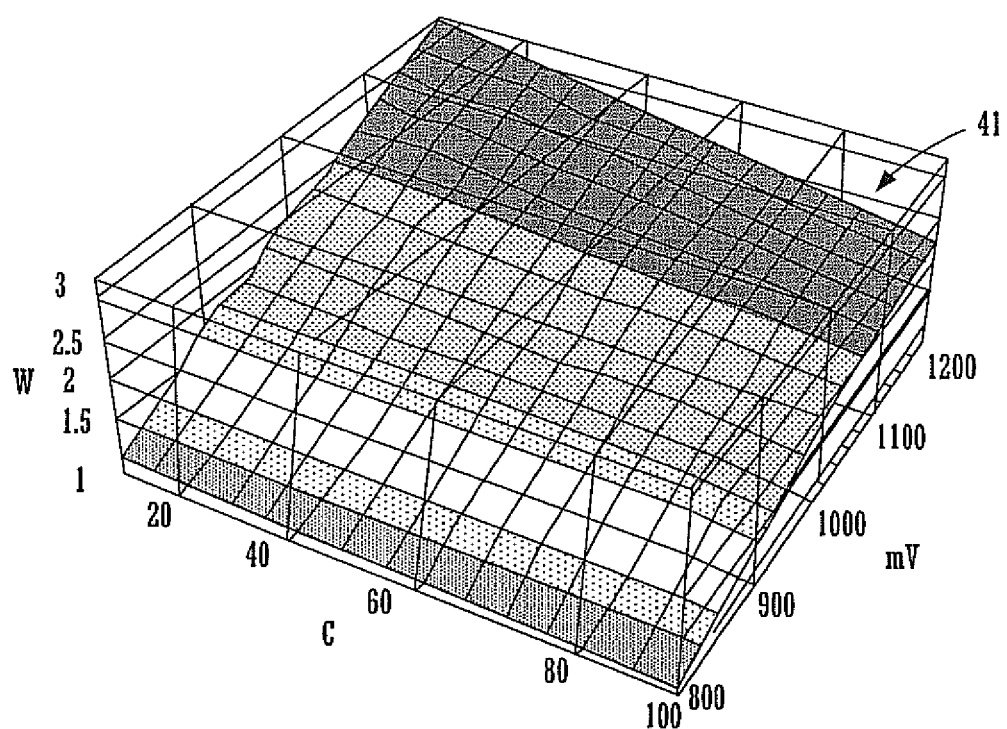
FIG. 4 is an example of a three-dimensional graph showing dynamic power versus temperature and voltage according to one embodiment of the present invention.

FIG. 4 is an example of a three-dimensional graph 40 showing dynamic power as a function of temperature and voltage according to one embodiment of the present invention. The surface 41 shows dynamic power consumption that is predicted for a device as a function of temperature and voltage. Actually, dynamic power is a function of process, voltage, frequency, and the type of instruction mix being executed by the microprocessor. For example, processor-intensive instructions would tend to increase the dynamic power.

In the example of FIG. 4, the dynamic power is predicted using the relationship:

$$Pd = FC(Vdd)^2, \quad (1)$$

where Pd is the dynamic power, F is the frequency, and C is 1.04 nano Farads (nF). Alternatively, the dynamic power can be actively measured using a sense pin attached to the microprocessor.

For a given voltage and temperature, the leakage power can be determined from the information presented in graph 30 and the dynamic power can be determined from the information presented in graph 40 of FIGS. 3 and 4, respectively. The leakage power and dynamic power can be summed to provide a prediction of the amount of power being consumed by the microprocessor.

Figure 5:
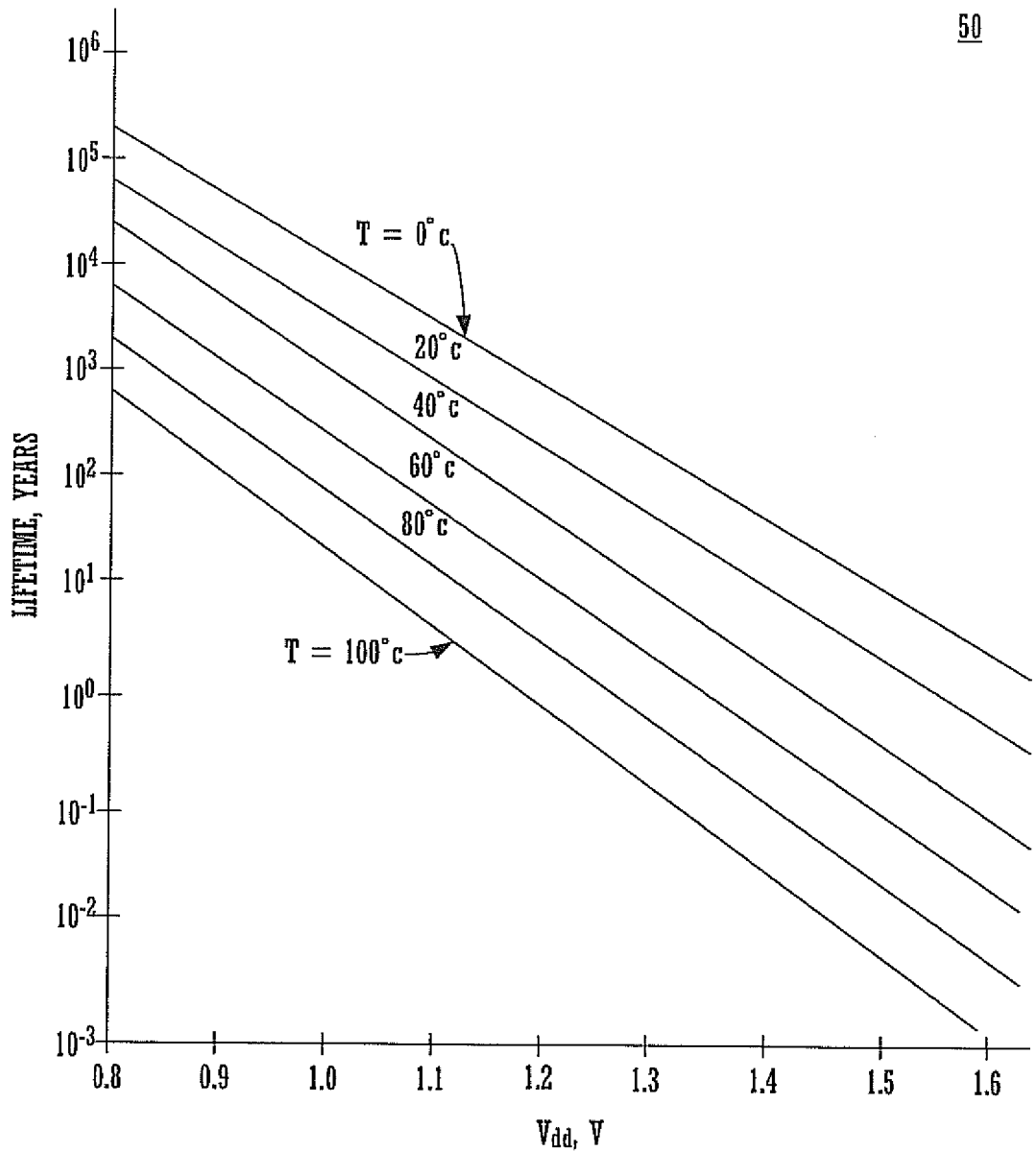
FIG. 5 is an example of a graph of operating life versus voltage according to one embodiment of the present invention.
Figure 6:
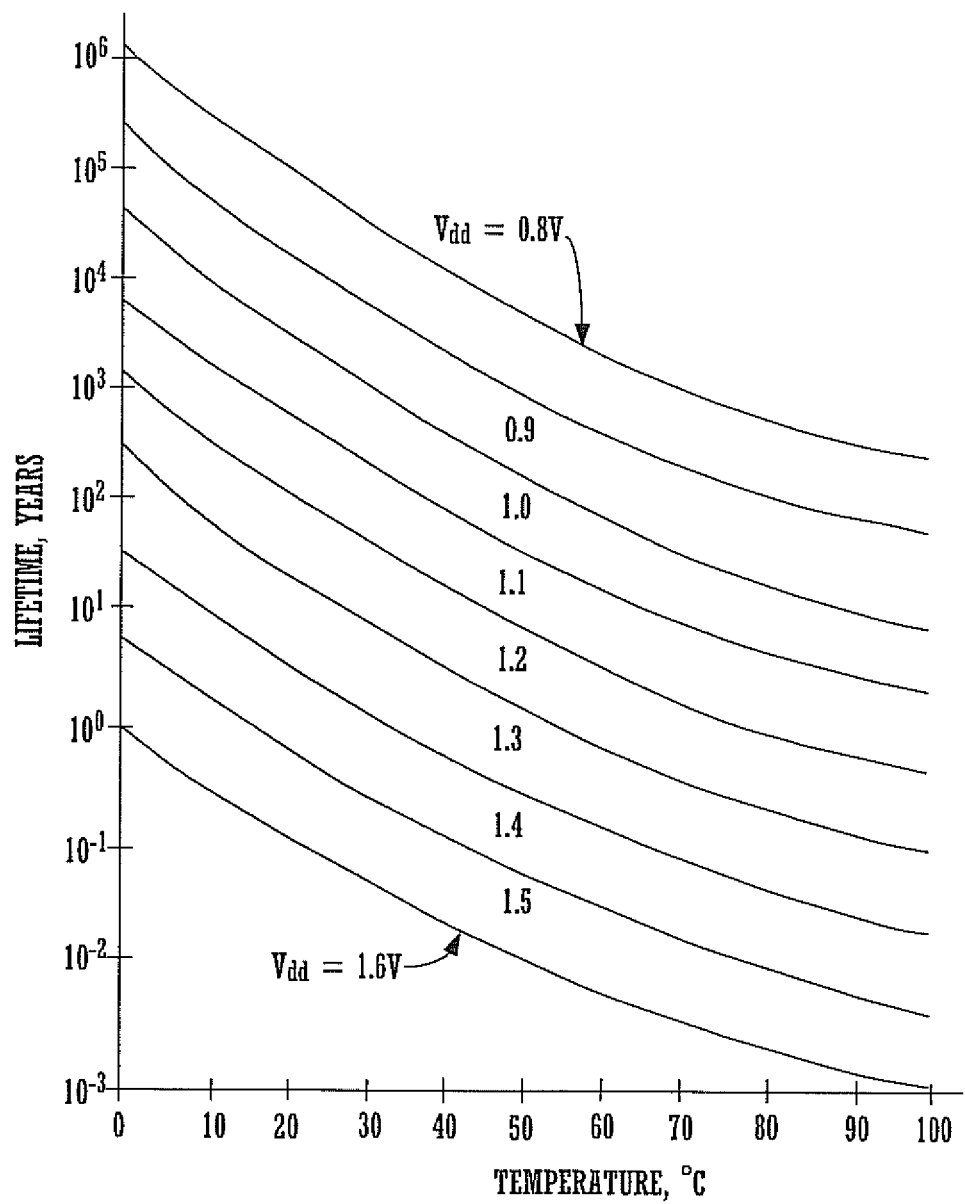
FIG. 6 is an example of a graph of operating life versus temperature according to one embodiment of the present invention.

FIG. 5 is a graph 50 illustrating microprocessor operating lifetime versus the voltage supplied to the microprocessor (Vdd) according to one embodiment of the present invention. FIG. 6 is a graph 60 illustrating microprocessor operating lifetime versus temperature according to one embodiment of the present invention. FIGS. 5 and 6 are illustrative only. In other words, the relationship between microprocessor operating lifetime and Vdd or temperature may be different than that shown by FIGS. 5 and 6.

As used herein, "processor operating lifetime" refers to the total amount of time that the microprocessor is turned on (powered). Only the time in which the microprocessor is actually powered is accumulated toward the microprocessor's operating lifetime. Thus, an operating lifetime of 10 years does not refer to 10 calendar years, but instead refers to 10 years (87,600 hours) of powered operation.

FIG. 5 shows microprocessor operating lifetime as a function of both Vdd and temperature. Actually, microprocessor operating lifetime is a function of not only voltage and temperature but also the fabrication process that was used as well as the different types of damage mechanisms that the microprocessor is exposed to. There are a number of failure mechanisms that can affect the operating lifetime of a microprocessor. These failure mechanisms include, but are not limited to, Time Dependent Dielectric Breakdown (TDDBn and TDDBp, for NMOS and PMOS devices, respectively), Hot Carrier Injection (HCI), and Electromigration. FIGS. 5 and 6 illustrate the relationship between Vdd, temperature, and operating lifetime for only one such failure mechanism. Plots of operating lifetime versus Vdd and microprocessor temperature, similar to those of FIGS. 5 and 6, can be generated for each of the various failure mechanisms considered.

According to FIG. 5, for a given temperature, microprocessor lifetime decreases as Vdd increases. As microprocessor temperature increases, microprocessor lifetime decreases (see also FIG. 6, below).

FIG. 6 is a graph 60 illustrating microprocessor operating lifetime versus temperature according to one embodiment of the present invention. As mentioned above, FIG. 6 is illustrative only. In other words, the relationship between microprocessor operating lifetime and microprocessor temperature may be different than that shown by FIG. 6. In actuality, the data plotted in FIG. 6 would be consistent with the data plotted in FIG. 5.

FIG. 6 shows microprocessor operating lifetime as a function of both temperature and Vdd. According to FIG. 6, for a given Vdd, microprocessor lifetime decreases as temperature increases. As Vdd increases, microprocessor lifetime decreases.

Using information such as that presented in FIG. 5 or 6 for each failure mechanism being considered, a predicted microprocessor lifetime can be determined supposing that the microprocessor operates according to a given Vdd and temperature. In essence, the predicted microprocessor lifetime is the time to failure. Thus, for example, using a figure such as FIG. 5 or 6 for HCI, the amount of time until a microprocessor fails due to HCI can be predicted depending on the operating conditions (e.g., the Vdd and temperature) of the microprocessor.

In one embodiment, the predicted microprocessor lifetime at a particular voltage and temperature is defined as the minimum of the predicted microprocessor lifetimes associated with each of the failure mechanisms being considered. In other words, in one embodiment, for a given voltage and temperature, the predicted microprocessor lifetime is established by the failure mechanism that is most limiting—the failure mechanism that will result in earliest failure of the microprocessor. One failure mechanism may be limiting for one set of operating conditions (e.g., a particular voltage and temperature, or a range of voltages and temperatures), and another failure mechanism may be limiting for another set of operating conditions (e.g., a particular voltage and temperature, or a range of voltages and temperatures).

According to embodiments of the present invention, a time scale factor (f) is defined as the ratio of the target or design operating lifetime to the predicted operating lifetime. That is, for a given voltage (V) and temperature (T), $$f(V,T) = [\text{design lifetime}]/[g(V,T)], \tag{2}$$

where the design lifetime (e.g., 10 years) is specified by the designer or user, and where g is the predicted operating lifetime established by the particular failure mechanism that may be most limiting at V and T, as described above.

Note that, in one embodiment, the value of voltage can be changed over the operating lifetime of the microprocessor, as explained above in conjunction with FIG. 1. Also, the temperature of the microprocessor can change over the operating lifetime of the microprocessor (e.g., due to the changes in voltage, changes in computational workload, or perhaps due to changes in the ambient temperature). Accordingly, the value of the time scale factor (f) can also change over the operating lifetime of the microprocessor. In some cases, the value of f can change hundreds of times per second.

At any given time, the value of the time scale factor provides an indication of how rapidly the microprocessor is aging relative to its design operating lifetime. If f equals one (1), then at that point in time the microprocessor is aging at the design rate (the rate that corresponds to the design operating lifetime). If f is less than 1, then at that point in time the microprocessor is aging at less than the design rate (and is thus predicted to have an operating lifetime that will exceed the design operating lifetime). If f is greater than 1, then at that point in time the microprocessor is aging at greater than the design rate (and is thus predicted to have an operating lifetime that will fall short of the design operating lifetime).

To achieve a design operating lifetime of 10 years, for example, the integral of the time scale factor over time (from zero to 10 operating years) should be less than or equal to 10 years, or $$f(V_1,T_1)\Delta t_1 + f(V_2,T_2)\Delta t_2 + \ldots + f(V_n,T_n)\Delta t_n \leq 10 \text{ years}, \tag{3}$$

where $\Delta t_i$ represents the amount of time (in fractions of years) that the microprocessor is operated according to a particular voltage ($V_i$) and temperature ($T_i$), and where the time scale factor f is determined using equations (1) and (3) above.

For a microprocessor such as processor unit 13 of FIG. 1, in which the supply voltage can be adjusted, various types of operating policies can be invoked in order to achieve the design operating lifetime. One such policy requires that the time scale factor never exceed 1.

Other policies that can be invoked involve keeping track of both the amount of time that the processor unit 13 (FIG. 1) is operated with f greater than 1, the amount of time that the microprocessor is operated with f less than 1, and the value of f during each such amount of time. Operation with f less than 1 can be used to at least partially offset operation with f greater than 1, and vice versa, depending on the amount of time that the microprocessor operated with f less than 1, the value of f<1 during that time, the amount of time that the microprocessor operated with f greater than 1, and the value of f>1 during that time.

Operation with f greater than 1 is referred to herein as "sprinting." In one embodiment, the microprocessor is permitted to sprint for a period of time that is equivalent in its effect on operating lifetime to the period of time that the microprocessor was operated at less than its operating limits. Conversely, if f is greater than 1 for a period of time, then over that period of time the microprocessor aged faster than its design rate. The microprocessor can then be operated for another period of time with f less than 1, to offset at least in part the accelerated rate of aging attributable to the operation with f greater than 1.

The amount of time that the microprocessor operates with f less than 1 and the amount of time that the microprocessor operates with f greater than 1 can be measured and recorded. In one embodiment, a credit and debit type of accounting is utilized to determine the net effect of operation with f less than 1 and f greater than 1. By keeping track of the net effect on predicted operating life, a number of different operating policies are available. According to one policy, if the net effect is negative, then operation with f greater than 1 is prohibited; only operation with f equal to or less than 1 is permitted. Operation with f less than 1 will result in the accumulation of positive credit that will eventually offset the net negative effect, at which point operation with f greater than 1 becomes permissible. Other policies are possible.

In overview, embodiments in accordance with the present invention utilize the models described above to extract performance from the microprocessor. As will be seen, power consumption can be reduced by, for example, reducing temperature to maintain a given frequency while reducing power to the microprocessor. Also, higher frequencies than formerly considered possible can be achieved by operating at higher voltages (and hence, higher frequencies) for controlled periods of time when needed (e.g., to execute processor-intensive instructions), and then offsetting any impact on design operating life by operating at lower voltages (and hence, lower frequencies) when higher frequencies are not needed.

As described above, in one embodiment, models are used to determine the values of parameters such as maximum frequency (FIG. 2), leakage power (FIG. 3), and dynamic power (FIG. 4). Other models that describe the impact of operating conditions on design operating lifetime (FIGS. 5 and 6) are also provided. Yet other models describe operating constraints such as temperature ranges, power limits and the like. These models are consulted to establish operating conditions (e.g., voltage and frequency) for the microprocessor. The models can be consulted periodically or each time a change in an operating condition (e.g., frequency, voltage or temperature) is contemplated. These models can be implemented in hardware or in software, and can be implemented on the microprocessor itself or on another device that controls the microprocessor.

In general, given the current operating temperature (e.g., a measured value), a power limit (e.g., a power limit on the microprocessor socket), and a design operating lifetime (e.g., 10 years), a request to operate at a certain frequency can be evaluated and an operating voltage can be selected.

Figure 7:
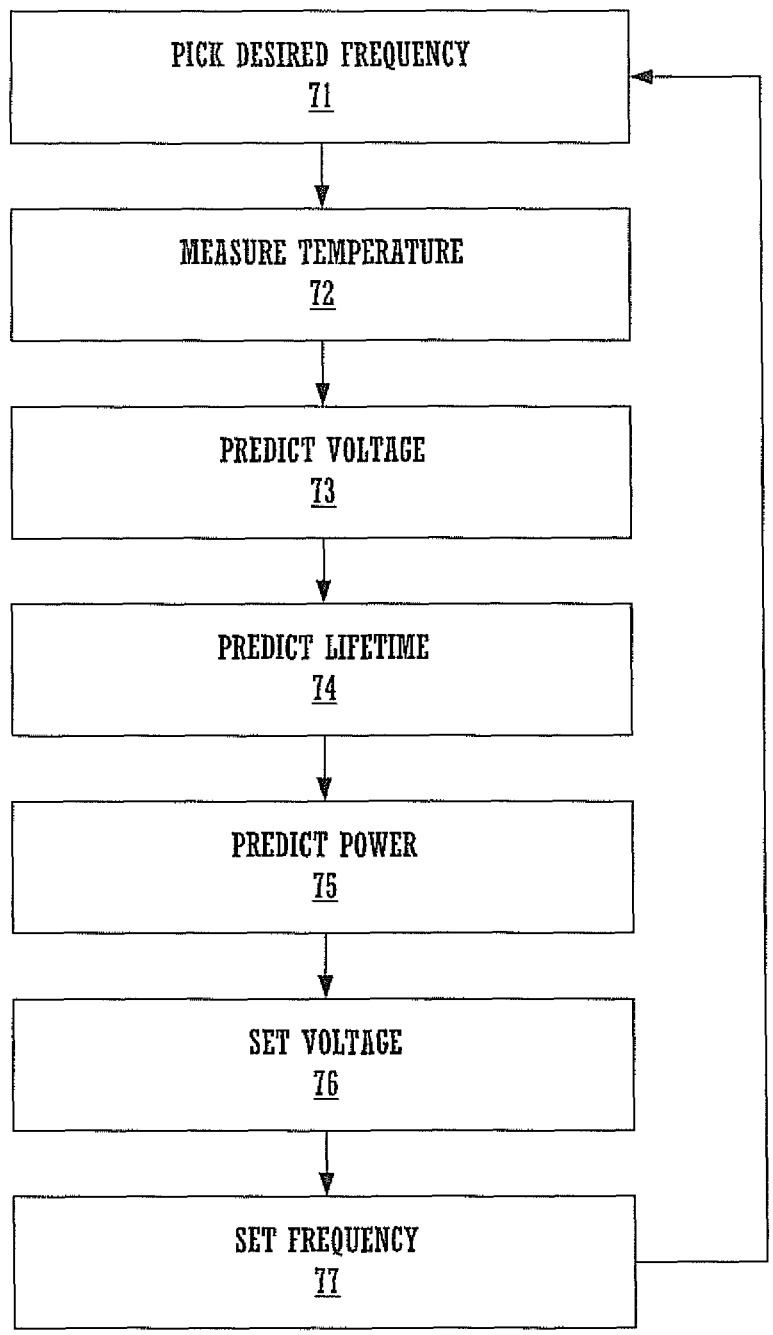
FIG. 7 is a flowchart of a method for operating a microprocessor in accordance with one embodiment of the present invention.

FIG. 7 is a flowchart 70 of a method for operating a microprocessor (e.g., processor unit 13 of FIG. 1) in accordance with one embodiment of the present invention. Although specific steps are disclosed in flowchart 70, such steps are exemplary. That is, embodiments of the present invention are well-suited to performing various other steps or variations of the steps recited in flowchart 70. It is appreciated that the steps in flowchart 70 may be performed in an order different than presented, and that not all of the steps in flowchart 70 may be performed.

Some or all of the processes and steps of flowchart 70 can be realized, in one embodiment, as a series of instructions that reside in hardware or software and are executed by processor unit 13 of FIG. 1. In another embodiment, those instructions can reside in hardware or software and be executed by a device that manages processor unit 13.

In general, to implement a method such as that described in flowchart 70, the microprocessor (or the device controlling the microprocessor) is made aware of the operating conditions and constraints to which it is subjected. The conditions and constraints include the acceptable range of operating temperatures, the range of voltages that can be selected, the range of permitted operating frequencies, power limitations, and the design operating lifetime.

In step 71 of FIG. 7, a desired operating frequency for the microprocessor is selected. The frequency may be same as the frequency at which the microprocessor is currently operating. Alternatively, the frequency may be selected in anticipation of a need to increase frequency or an opportunity to decrease frequency. In general, flowchart 70 can be implemented prior to changing frequency when a decision to change the frequency has already been made or when a change in frequency is being contemplated.

In step 72, the temperature of the microprocessor is measured. In general, a temperature value associated with the device's temperature is accessed. That is, the temperature value may be the actual temperature of the device determined by direct measurement, or the temperature value may be an estimate derived from, for example, ambient temperature measurements.

In step 73, a voltage value corresponding to the selected frequency and the device temperature is identified. In one embodiment, the voltage value can be identified using information such as that provided in FIG. 2. However, as mentioned above, the relationship between maximum frequency, voltage and temperature can be expressed in other ways.

If the selected frequency is too high, such that a valid voltage value cannot be identified for the given temperature condition, then flowchart 70 returns to step 71 and a new frequency is selected for evaluation.

In step 74, in the present embodiment, for the given operating conditions (that is, for the temperature value of step 72 and the voltage value of step 73), the effect on device lifetime can be evaluated. As described above, different lifetime models can be employed. In one embodiment, operating conditions that would shorten the predicted lifetime are not permitted. That is, in one embodiment, operating conditions that would exceed the operating limits that are prescribed in order to achieve a design operating lifetime are not permitted. In such an embodiment, if the selected frequency (step 71) results in identification of a voltage value that is too high (in step 73), then flowchart 70 returns to step 71 and a new frequency is selected for evaluation.

In another embodiment, as described above in conjunction with FIGS. 5 and 6, operation above prescribed operating limits is permitted provided such operation is offset by operation below operating limits some other time. In such an embodiment, a credit and debit system is used to track the net effect of operation above and below operating limits, and a decision with regard to whether or not operation above operating limits will be permitted depends on whether or not the net effect is positive or negative. If operation above operating limits is not permitted, then flowchart 70 returns to step 71 and a new frequency is selected for evaluation. Otherwise, in the present embodiment, flowchart 70 continues to step 75.

In step 75, in the present embodiment, the leakage power associated with the temperature value (step 72) and the identified voltage value (step 73) is predicted. Also, the dynamic power associated with those temperature and voltage values as well as the selected frequency (step 71) is predicted. In one embodiment, the leakage power can be determined using information such as that provided in FIG. 3, and the dynamic power can be determined using information such as that provided in FIG. 4.

The predicted leakage power and the predicted dynamic power are summed to determine total power. If the predicted total power exceeds a specified power limit, then flowchart 70 returns to step 71 and a new frequency is selected for evaluation. The power limit may be the maximum socket power (for the socket associated with the microprocessor); however, the present invention is not so limited. Alternatively, the power limit may be specified by the operating system, or the power limit may be based on the amount of remaining battery life, for example.

Note that steps 74 and 75 can be performed in reverse order, or they can be performed concurrently.

In step 76 of FIG. 7, upon determining that the voltage value of step 73 is acceptable according to the evaluations described above, voltage corresponding to that value is supplied to the microprocessor.

In step 77, the microprocessor is operated at the frequency selected in step 71. As mentioned above, on occasion the microprocessor may be operated in excess of that frequency. Also, the microprocessor can be operated at less than that frequency, depending on the complexity of the instructions being executed, for example. Thus, in situations where it is acceptable to do so, the microprocessor can be operated at less than the maximum frequency that was evaluated in flowchart 70, thereby reducing voltage and power requirements (thus saving power) and thereby also reducing the effect on the design operating lifetime of the device (thus increasing lifetime, or thus permitting sprinting at some future point in time). Also, as temperature increases with operation, it may be desirable to reduce frequency to remain within the voltage limit or within a prescribed power limit.

In one embodiment, upon selecting values for operating frequency and supply voltage, it may be beneficial to reduce device temperature by implementing supplemental cooling means such as fans, Peltier coolers, or the like. The drawback to the use of supplemental cooling is that power consumption is increased. However, the use of supplemental cooling has advantages that may offset that drawback. For example, by lowering device temperature, the maximum frequency at a given voltage value is increased. Thus, reducing temperature may be beneficial during periods when a higher operating frequency is desirable. That is, by reducing device temperature, frequency can be increased without increasing frequency, and thus without increasing any negative effect on predicted operating lifetime. Also, by lowering device temperature, a given operating frequency can be maintained while supply voltage is reduced. With reduced voltage, leakage power and dynamic power are also reduced (see FIGS. 3 and 4, for example). Accordingly, the power consumed by the supplemental cooling devices may be offset, at least to some degree, by a decrease in power consumed by the microprocessor. Also, with reduced voltage, any negative effect on predicted operating lifetime is reduced.

In summary, embodiments of the present invention provide methods and systems for operating a semiconductor device (e.g., a microprocessor). The microprocessor is initially operating at some voltage and frequency. Using models that relate device temperature, operating limits, and power consumption with voltage and frequency, the amount of supply voltage can be changed and a new operating frequency can be selected. The models are periodically consulted thereafter to continue adjusting the supply voltage and operating frequency, so that the microprocessor is caused to operate at very close to its capacity, in particular in those instances when, for example, processor-intensive instructions are being executed. In this manner, the guardband can be reduced.

Embodiments in accordance with the present invention are thus described. While the present invention has been described in particular embodiments, it should be appreciated that the present invention should not be construed as limited by such embodiments, but rather construed according to the below claims.

What is claimed is:

1. A method comprising:
   while an integrated circuit is operating at a first frequency, selecting a second frequency for operation of the integrated circuit;
   prior to changing to the second frequency:
      obtaining a voltage value that corresponds to the second frequency and to a temperature value related to a temperature of the integrated circuit;
      estimating an amount of power consumed by the integrated circuit if operated at the second frequency and at the voltage value; and
      determining if the amount of power exceeds a predefined power limit; and
   operating the integrated circuit at a power level lower than the amount of power and corresponding to a third frequency different than the first frequency and different than the second frequency if the amount of power exceeds the predefined power limit, and otherwise operating the integrated circuit at a power level corresponding to the second frequency, wherein the third frequency is less than the second frequency if the amount of power corresponding to the second frequency is greater than the predefined power limit.

2. The method of claim 1 wherein said estimating comprises:
   obtaining a first power value that corresponds to an amount of leakage power at the temperature value and the voltage value;
   obtaining a second power value that corresponds to an amount of dynamic power consumed by the integrated circuit resulting from operation at the second frequency, the temperature value, and the voltage value; and
   summing the first power value and the second power value to estimate the amount of power.

3. The method of claim 1 further comprising:
   determining if the voltage value differs from a voltage limit that corresponds to the temperature value; and
   adjusting a frequency at which the integrated circuit is operating if the voltage value differs from the voltage limit.

4. The method of claim 1 further comprising:
   obtaining a measure of divergence from a design operating life specified for the integrated circuit as a result of the integrated circuit operating at the voltage value and the temperature value; and
   adjusting a frequency at which the integrated circuit is operating to offset at least a portion of the measure of divergence.

5. The method of claim 1 further comprising changing a voltage at which the integrated circuit is operating to cause a change from the first frequency to the second frequency.

6. The method of claim 1 further comprising changing a temperature at which the integrated circuit is operating to permit a change from the first frequency to the second frequency.

7. The method of claim 1 wherein the second frequency is greater than the first frequency if the amount of power is less than the predefined power limit and operations to be performed by the integrated circuit are determined to be greater in complexity relative to operations being performed at the first frequency, and wherein the second frequency is less than the first frequency if operations to be performed by the integrated circuit are determined to be lesser in complexity relative to operations being performed at the first frequency.

8. A method comprising:
   while an integrated circuit is operating at a first frequency and prior to changing the first frequency to a different frequency:
      obtaining a voltage value that corresponds to a second frequency different from the first frequency and a temperature value, wherein the second frequency is related to operation of the integrated circuit and wherein the temperature value is related to a temperature of the integrated circuit;
      accessing a stored power limit;
      estimating an amount of power consumed by the integrated circuit if the integrated circuit is operated at the second frequency and at the voltage value; and
      adjusting the second frequency to a third frequency that is less than the second frequency and reducing the amount of power to a power level corresponding to the third frequency if the amount of power from said estimating exceeds the stored power limit;
   and
   operating the integrated circuit at a power level corresponding to the second frequency if the amount of power consumed by the integrated circuit at the second frequency is determined to satisfy the stored power limit and otherwise operating the integrated circuit at the power level corresponding to the third frequency.

9. The method of claim 8 further comprising:
   obtaining a measure of divergence from a design operating life specified for the integrated circuit as a result of the integrated circuit operating at the voltage value and the temperature value; and
   adjusting at least one of the voltage and temperature values to offset at least a portion of the measure of divergence.

10. The method of claim 8 wherein said adjusting the second frequency comprises adjusting at least one of the temperature and voltage values if the amount of power differs from the stored power limit.

11. The method of claim 8 wherein said estimating comprises:
    obtaining a first power value that corresponds to an amount of leakage power at the temperature value and the voltage value;
    obtaining a second power value that corresponds to an amount of dynamic power consumed by the integrated circuit resulting from operation at the second frequency, the temperature value, and the voltage value; and
    summing the first power value and the second power value to determine the amount of power consumed by the integrated circuit.

12. The method of claim 8 wherein said adjusting comprises increasing the first frequency if the amount of power is less than the stored power limit and in response to an indication that operations to be performed by the integrated circuit increase in complexity relative to operations being performed at the first frequency, and decreasing the first frequency in response to an indication that operations to be performed by the integrated circuit decrease in complexity relative to operations being performed at the first frequency.

13. The method of claim 8 wherein said adjusting comprises decreasing the first frequency if the amount of power is greater than the stored power limit.

14. A computer system comprising:
    memory; and
    a processor coupled to the memory, wherein the computer system is configured to perform operations comprising:
        while an integrated circuit is operating at a first frequency, selecting a second frequency for operation of the integrated circuit;
        prior to changing to the second frequency:
            obtaining a voltage value that corresponds to the second frequency and to a temperature value related to a temperature of the integrated circuit;
            estimating an amount of power consumed by the integrated circuit if operated at the second frequency and at the voltage value; and
            determining if the amount of power that would be consumed by the integrated circuit, resulting from operation at the second frequency and a voltage corresponding to the voltage value, exceeds a power limit stored in the memory;
        and
        operating the integrated circuit at a power level lower than the amount of power and corresponding to a third frequency different than the first frequency and less than the second frequency if the amount of power exceeds the power limit, and otherwise operating the integrated circuit at a power level corresponding to the second frequency.

15. The computer system of claim 14 further configured to perform operations comprising:
    obtaining a first power value that corresponds to an amount of leakage power at the temperature value and the voltage value;
    obtaining a second power value that corresponds to an amount of dynamic power consumed by the integrated circuit resulting from operation at the second frequency, the temperature value, and the voltage value; and
    summing the first power value and the second power value to estimate the amount of power.

16. The computer system of claim 14 further configured to perform operations comprising:
    determining if the voltage value differs from a voltage limit that corresponds to the temperature value; and
    adjusting a frequency at which the integrated circuit is operating if the voltage value differs from the voltage limit.

17. The computer system of claim 14 further configured to perform operations comprising:
    obtaining a measure of divergence from a design operating life specified for the integrated circuit as a result of the integrated circuit operating at the voltage value and the temperature value; and
    adjusting a frequency at which the integrated circuit is operating to offset at least a portion of the measure of divergence.

18. The computer system of claim 14 further configured to perform operations comprising changing a voltage at which the integrated circuit is operating to cause a change from the first frequency to the second frequency.

19. The computer system of claim 14 further configured to perform operations comprising changing a temperature at which the integrated circuit is operating to permit a change from the first frequency to the second frequency.

\* \* \* \* \*